United States Patent

Stevens et al.

(10) Patent No.: US 10,299,114 B1
(45) Date of Patent: May 21, 2019

(54) EXTERNAL CRYPTO MODERNIZATION OF LEGACY RADIOS

(71) Applicants: James A. Stevens, Lucas, TX (US); Hiren Sampat, McKinney, TX (US)

(72) Inventors: James A. Stevens, Lucas, TX (US); Hiren Sampat, McKinney, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 312 days.

(21) Appl. No.: 14/840,259

(22) Filed: Aug. 31, 2015

(51) Int. Cl.
*H04L 9/08* (2006.01)
*H04W 12/04* (2009.01)

(52) U.S. Cl.
CPC ........... *H04W 12/04* (2013.01); *H04L 9/0891* (2013.01)

(58) Field of Classification Search
CPC .............................. H04L 9/0891; H04W 12/04
See application file for complete search history.

(56) References Cited

U.S. PATENT DOCUMENTS

| | | | | |
|---|---|---|---|---|
| 2002/0033416 A1* | 3/2002 | Gerszberg | ........... | H04M 19/001 235/380 |
| 2002/0178354 A1* | 11/2002 | Ogg | ..................... | G06Q 20/382 713/155 |
| 2002/0196782 A1* | 12/2002 | Furukawa | ............ | H04Q 3/0025 370/352 |
| 2004/0015708 A1* | 1/2004 | Obayashi | .................. | G06F 8/65 713/189 |
| 2004/0113585 A1* | 6/2004 | Stanesti | ................ | H02J 7/0018 320/116 |
| 2005/0166066 A1* | 7/2005 | Ahuja | ................... | H04L 63/102 713/189 |
| 2007/0076810 A1* | 4/2007 | Herrera | ..................... | H04L 1/20 375/261 |
| 2008/0220757 A1* | 9/2008 | Zeller | .................... | H04B 1/005 455/418 |
| 2008/0279171 A1* | 11/2008 | Kim | ..................... | H04L 1/1685 370/346 |
| 2011/0194250 A1* | 8/2011 | Perkins, III | .......... | H05K 7/1412 361/690 |
| 2012/0198083 A1* | 8/2012 | Killian | ................ | H04L 12/2809 709/228 |

(Continued)

*Primary Examiner* — Samson B Lemma
*Assistant Examiner* — Arya Golriz
(74) *Attorney, Agent, or Firm* — Angel N. Gerdzhikov; Donna P. Suchy; Daniel M. Barbieri

(57) ABSTRACT

An apparatus and method for providing external bump-in-the-wire cryptographic capability to a legacy radio (which may or may not include embedded cryptography) includes an appliqué couplable to the legacy radio and to an intercom, handset, or other user device. The appliqué extracts and stores in memory radio status information from the legacy radio (channel information, cryptographic instructions, alarm conditions) by intercepting control signals, polling the legacy radio, or listening in on channels used by the legacy radio. If TSVCIS 2.1 or CMI-compatible encryption is required, the appliqué may encrypt or decrypt a message with the appropriate cryptographic keys based on the extracted radio status information. The appliqué may include a bump-in-the-wire device or a bump-in-the-connector device directly couplable to an intercom port of a vehicular mounted SINCGARS legacy radio.

16 Claims, 7 Drawing Sheets

(56) References Cited

U.S. PATENT DOCUMENTS

2013/0104232 A1    4/2013   Johnson et al.
2016/0142532 A1*  5/2016   Bostick ............. H04M 1/72577
2016/0156462 A1*  6/2016   Winslow ................ H04L 9/083
                                                                                  380/279

* cited by examiner

200

240 — Zeroizing the at least one appliqué by deleting from the memory the at least one cryptographic key and the at least one cryptographic instruction

EXTERNAL CRYPTO MODERNIZATION OF LEGACY RADIOS

BACKGROUND

Pursuant to the Cryptographic Modernization Initiative (CMI), a joint initiative involving the Department of Defense (DoD) and the National Security Agency (NSA), newer generations of military radios may include embedded cryptography compliant with Tactical Secure Voice Common Interoperability Standard (TSVCIS) 2.1, the NSA's CMI standard for Single Channel Ground and Airborne Radio System (SINCGARS) radios and other narrowband waveforms. However, hundreds of thousands of legacy SINCGARS radios remain in the field, none of which are TSVCIS 2.1 compatible. Replacing these legacy radios with next-generation models would ensure CMI compliance, but at a high cost. Replacing the embedded cryptographic cards in over half a million legacy radios is also an expensive and cumbersome solution. It may therefore be desirable to provide a low-cost, efficient means of providing TSVCIS 2.1 capability to legacy SINCGARS radios with embedded cryptography without replacing or modifying the radios.

SUMMARY

In one aspect, embodiments of the inventive concepts disclosed herein are directed to an appliqué for externally providing cryptographic capability to at least one legacy radio which may or may not have an embedded cryptographic device. For example, the appliqué may include a first interface couplable to a user device (ex.—intercom, handset), the first interface configured to receive an audio signal from the user device, and to transmit an alarm to the user device. The appliqué may include a second interface couplable to the legacy radio, the second interface configured to receive a first digital signal from the legacy radio. The appliqué may include a channel indicator coupled to the second interface, the channel indicator configured to extract radio status information from the legacy radio or from its embedded cryptographic device, the radio status information associated with a plurality of channels used by the legacy radio. The appliqué may include a memory coupled to a processor, the memory for storing extracted radio status information, cryptographic keys loaded to the appliqué, or cryptographic instructions associated with the channels of the legacy radio. The processor may digitize a received audio signal and encode the resulting digital audio signal. The appliqué may include a cryptographic management interface (cryptographic engine) for encrypting the encoded signal by applying cryptographic keys based on extracted radio status information (e.g., channels in use). The cryptographic management interface may decrypt a received digital signal based on extracted radio status information. The processor may decode the decrypted signal and generate an audio signal based on the decoded signal for reception by the user device. The cryptographic management interface may load cryptographic keys based on radio status information or other instructions or zeroize the appliqué by deleting from memory loaded cryptographic keys and cryptographic instructions. The cryptographic management interface may perform key rollovers based on cryptographic instructions or schedules stored in memory, or generate an alarm based on alarm conditions included in the cryptographic instructions. The appliqué may include a power source which draws recharge power from signals received from the legacy radio.

In a further aspect, the inventive concepts disclosed herein are directed to a method for providing external (ex.—bump-in-wire, bump-in-connector) cryptographic capability to at least one legacy radio which may or may not have an embedded cryptographic device. The method may include: loading at least one of a cryptographic key and a cryptographic instruction to memory of an appliqué couplable to the legacy radio; extracting, via the appliqué, radio status information associated with at least one channel of the legacy radio from the legacy radio or from its embedded cryptographic device; generating, via a user device (ex.—intercom, handset) couplable to the appliqué, an audio signal; digitizing, via the appliqué, the audio signal; encoding, via the appliqué, the digitized signal; encrypting the encoded signal by applying cryptographic keys based on the extracted radio status information; and transmitting the encrypted signal via a designated channel of the legacy radio.

BRIEF DESCRIPTION OF THE DRAWINGS

The inventive concepts disclosed herein may be better understood by those skilled in the art by reference to the accompanying figures in which.

DETAILED DESCRIPTION

Features of the inventive concepts disclosed herein in their various embodiments are exemplified by the following descriptions with reference to the accompanying drawings, which describe the inventive concepts with further detail. It is to be understood that both the foregoing general description and the following detailed description are exemplary and explanatory only and are not necessarily restrictive of the inventive concepts disclosed and claimed herein. These drawings depict only exemplary embodiments of the inventive concepts, and should not be considered to limit their scope in any way.

Figure 1A:
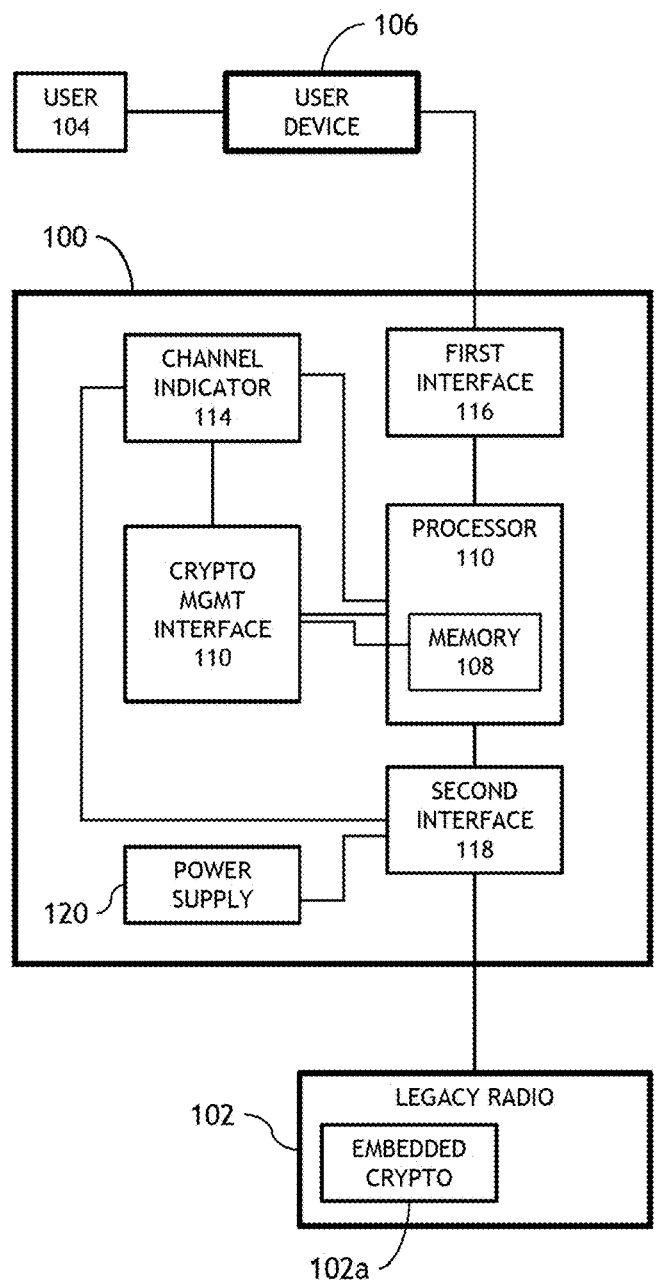
FIGS. 1A, 1B, and 1C are block diagrams depicting an appliqué according to embodiments of the inventive concepts disclosed herein.

Referring to FIG. 1A, in one embodiment an appliqué 100 according to the inventive concepts disclosed herein may be connected to a legacy radio 102 and to a user device 106. The legacy radio 102 may or may not include an embedded cryptographic device (ex.—legacy crypto) 102a for providing both communications security (COMSEC) and transmission security (TRANSEC) for voice or audio generated by a user 104 via the user device 106. The user device 106 may include a headset, handset, or intercom capable of receiving an audio signal. The legacy radio 102 (via the embedded cryptographic device 102a, if one is included) may digitize and encode the audio signal (via continuously variable slope delta (CVSD) or any similarly appropriate speech coding protocol), and apply one or more previously loaded cryptographic keys or COMSEC keys to the outgoing signal. For example, the legacy radio 102 or the embedded cryptographic device 102a may apply a particular cryptographic key to encrypt an outgoing transmission based on the channel or channels via which the outgoing transmission is to be sent. Similarly, incoming transmissions received by the legacy radio 102 may be decrypted based on the channel via which the incoming transmission was received. The decrypted transmission may be decoded, converted to analog audio, and transmitted to the user via the user device 106. If the user wishes to send and receive transmissions encrypted by legacy COMSEC in this fashion, or send and receive unencrypted "black" transmissions, the user may simply omit the loading of TSVCIS 2.1 or similar CMI-compatible COMSEC keys to the appliqué 100.

If the user wishes to send and receive transmissions using TSVCIS 2.1, the user may load one or more CMI-compliant COMSEC keys into the memory 108 of the appliqué 100. Cryptographic functions may be handled by the cryptographic management interface (ex.—cryptographic engine) 108 of the appliqué 100, while signal processing may be handled by one or more processors 112 of the appliqué 100. Radio status information may be extracted from the legacy radio 102 by the appliqué 100. Based on the extracted radio status information the cryptographic management interface 110 may determine which cryptographic keys to apply to incoming or outgoing transmissions. For example, the appliqué 100 or its channel indicator 114 may listen for and intercept control signals sent to the legacy radio 102 (or to the embedded cryptographic device 102a, if one is included) by the user device 106) and thereby determine radio status information relevant to a given transmission (e.g., which channel to use, whether to encrypt the message, and which encryption keys are to be used). The appliqué 100 or its channel indicator 114 may continually poll the legacy radio 102 for radio status information such as channels in use or additional instructions. For example, as a security measure the appliqué 100 or its channel indicator 114 may at intervals poll the legacy radio 102 for authorization to zeroize the appliqué 100. If the appliqué 100 or its channel indicator 114 receives a negative response, i.e., do not zeroize, the appliqué 100 will heed the response. However, if the appliqué 100 or its channel indicator 114 does not receive a negative response, the appliqué 100 may interpret the lack of a negative response as a condition whereby zeroization may be appropriate. The cryptographic management interface 110 may zeroize the appliqué 100 by clearing any cryptographic keys or instructions from the memory 108 of the appliqué 100. Cryptographic instructions may include one or more or alarm conditions, under which the cryptographic management interface 110 generates an alarm audible or visible to the user 104 via the user device 106. For example, alarm conditions may include the absence of any valid cryptographic keys, any attempt to tamper with the system, or the use of an unsecured or unencrypted channel. The cryptographic management interface 110 may then direct a first interface (ex.—port) 116 of the appliqué 100 to generate an alarm tone audible by the user 104 via the user device 106 or a visual alert displayed to the user 104 by the user device 106, which may be connected to the appliqué 100 via the first interface 116.

The appliqué 100 or its channel indicator 114 may additionally acquire radio status information by listening in on every channel available to the legacy radio 102. For example, the appliqué 100 or its channel indicator 114 may listen for high quality reception on a given channel used by the legacy radio 102 and use that channel as a default transmission channel, following any cryptographic instructions stored in the memory 108 associated with that particular channel. The appliqué 100 or its channel indicator 114 may listen for voice recognition of spoken text, using the associated channel on which the voice was found as a transmission channel.

Radio status information may include channel information, e.g., which channel the legacy radio 102 is using to transmit or receive the current message. Radio status information may additionally include instructions for the cryptographic management interface 110. For example, radio status information may include information about which cryptographic keys correspond to each channel used by the legacy radio 102. Use of some channels may provide for no encryption whatsoever, either by the legacy radio 102 or by the appliqué 100. Use of other channels may provide for the use of legacy encryption by the legacy radio 102 or the embedded cryptographic device 102a. Finally, use of still other channels may provide for the use of CMI compliant encryption via the appliqué 100, in which case specific instructions (e.g., which keys to use on which channels) may be included in radio status information or stored in the memory 108 of the appliqué 100. Radio status information may additionally include instructions for when the appliqué 100 should execute a key rollover, substituting a second set of key instructions for a previous set. Radio status information may include instructions for when the cryptographic management interface 110 should zeroize the appliqué 100 by clearing the memory 108 of all previously loaded keys and instructions.

The appliqué 100 may include a second interface (ex.—port) 116 for connecting to the legacy radio 102. Both the first interface 116 and the second interface (ex.—port) 118 may be compatible with both analog audio and digital signals. For example, if the user device 106 provides digital control signals, the first interface 116 may receive and pass a digital control signal from the user device 106 to the legacy radio 102. Similarly, the second interface 118 may receive and pass an analog audio signal 122 from the user device 106 to the legacy radio 102 without external encryption. The channel indicator 114 may be connected to the second interface 118 and use the interface for listening in on channels used by, and available to, the legacy radio 102. The appliqué 100 may be powered by a battery or other onboard power supply 120. For example, the power supply 120 may be a battery that recharges via a power signal or traffic signal received through the second interface 118.

Figure 1B:
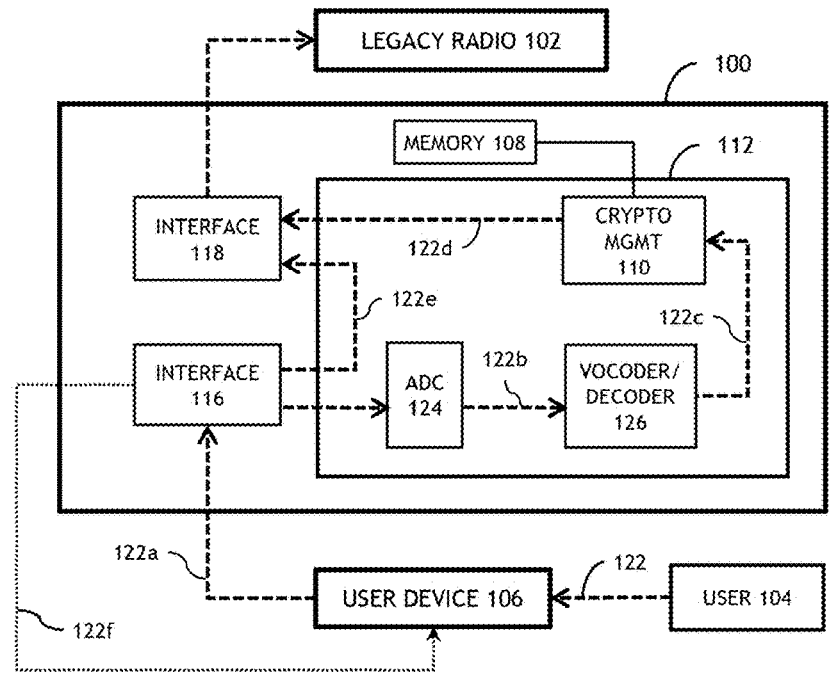

Referring also to FIG. 1B, signal processing of messages received and transmitted by the legacy radio 102 may be handled by the legacy radio 102 or by the onboard processors 112 of the appliqué 100. For example, a user 104 may load (ex.—input) one or more cryptographic keys or instructions to the memory 108 of the appliqué 100. The user may then select a channel for transmission. The channel indicator 114 (not shown) may instead select a channel depending, for example, on the channel already in use to receive a previous message. The user may speak (122) into the user device 104, generating an audio signal 122a received by the first interface 116 of the appliqué 100. A digitizer or similar analog/digital converter (ADC) component 124 of the processors 112 of the appliqué 100 may generate a digital signal 122b corresponding to the received audio signal 122a. The digital signal 122b may be compressed or encoded by a vocoder/decoder 126 of the processor 112 (via mixed excitation linear prediction (MELP) or any similar appropriate speech coding protocol), generating an encoded signal 122c. If TSVCIS 2.1 or other CMI-compliant encryption of the message 122 is desired or required, the cryptographic management interface 110 of the appliqué 100 may encrypt the encoded signal 122c by applying one or more COMSEC keys. The cryptographic management interface 110 may encrypt the encoded signal 122c depending on radio status information stored in the memory 108 of the appliqué 100 (the cryptographic keys selected may be determined by the channel currently in use by the legacy radio 102, or according to other instructions stored in the memory 108). The appliqué 100 may then pass the resulting encrypted signal 122d to the legacy radio 102 (via the second interface 118) for transmission. However, if the user desires no encryption of the message 122, or desires legacy encryption of the message 122 by the legacy radio 102, the appliqué may simply pass the received audio signal to the legacy radio 102 via the second interface 118 without further modification (122e). In addition, if an alarm condition is triggered, the first interface 116 may transmit an alarm 122f to the user 104 via the user device 106. For example, an alarm 122f may include an auditory alarm audible to the user 104 via the user device 106, or a visual alarm displayed to the user 104 via a screen or other display unit of the user device 106. The alarm 122f may be generated by the cryptographic management interface 110 of the appliqué 100.

Figure 1C:
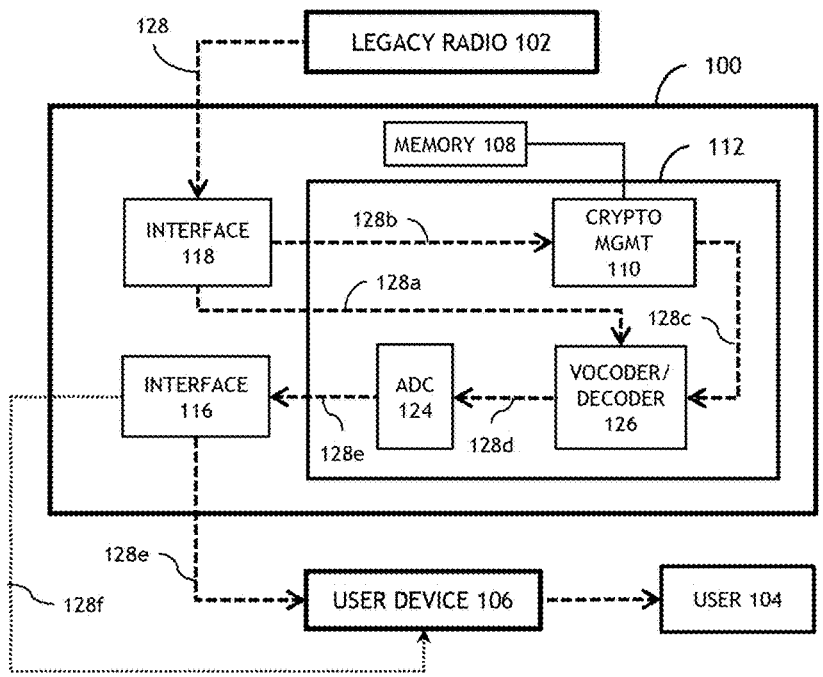

Referring also to FIG. 1C, a digital signal 128 may be received by the legacy radio 102. If the digital signal 128 is not externally encrypted, it may be passed (128a) via the second interface 118 directly to the vocoder/decoder 126. In the alternative, if the digital signal 128 is not externally encrypted, the appliqué 100 may pass the digital signal (128b) to the cryptographic management interface 110 via the second interface 118. The cryptographic management interface 110 may decrypt the digital signal 128b depending on radio status information stored in the memory 108 of the appliqué 100. The resulting decrypted signal 128c may be passed to the vocoder/decoder 126. The decompressed, decoded digital signal 128d may be passed to the ADC component 124, which generates an analog audio signal 128e based on the decoded digital signal 128d. The first interface 116 may pass the analog audio signal 128e to the user 104 via the user device 106. If an alarm condition is triggered, the first interface 116 may transmit an alarm 128f to the user 104 via the user device 106. For example, an alarm 128f may include an auditory alarm audible to the user 104 via the user device 106, or a visual alarm displayed to the user 104 via a screen or other display unit of the user device 106. The alarm 128f may be generated by the cryptographic management interface 110 of the appliqué 100.

Figure 2A:
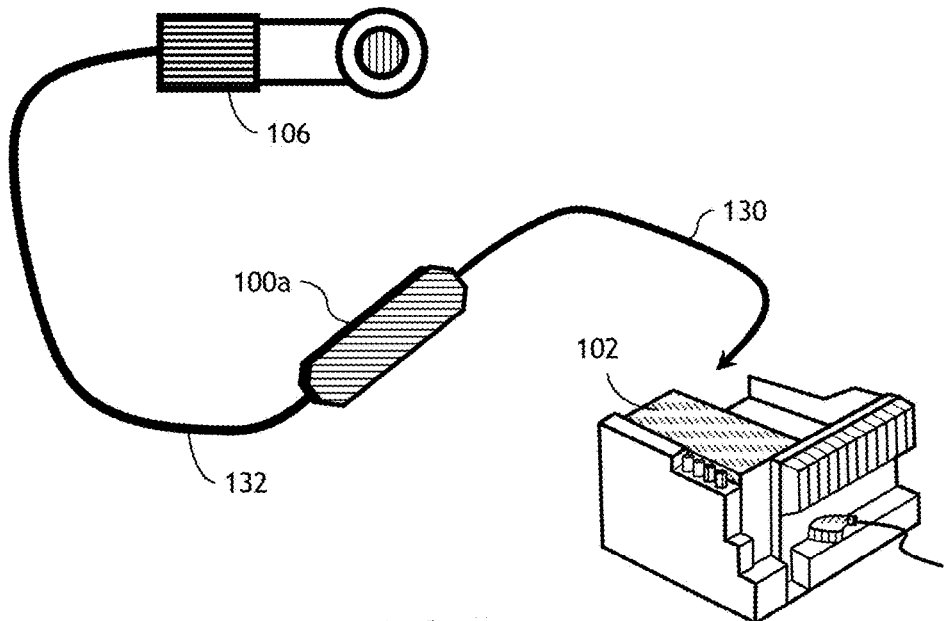
FIGS. 2A and 2B are illustrations of an appliqué according to embodiments of the inventive concepts disclosed herein.
Figure 2B:
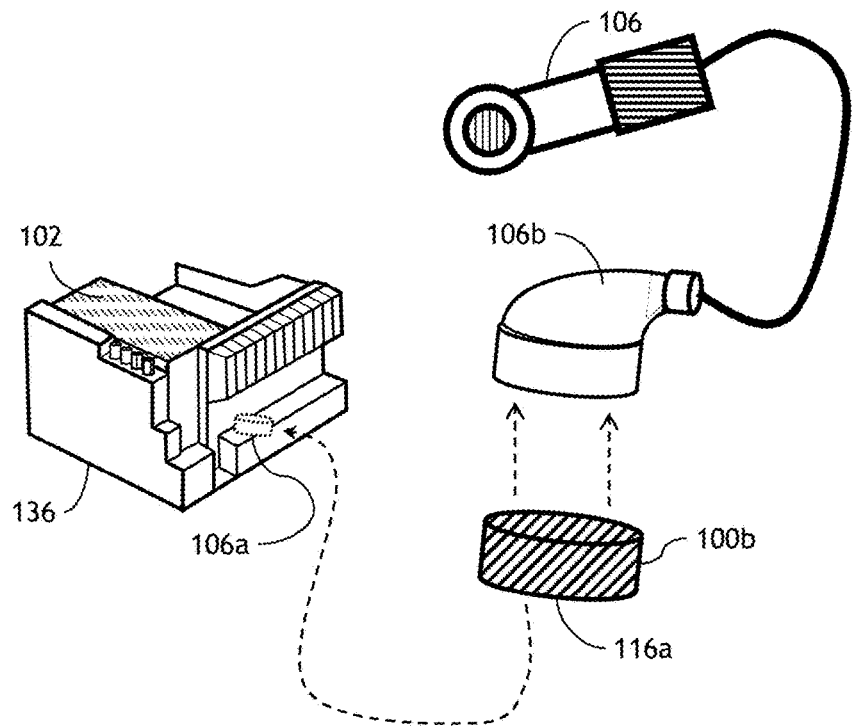

Referring to FIG. 2A, the appliqué 100 may include a bump-in-the-wire appliqué 100a. For example, the bump-in-the-wire appliqué 100a may be connectable to the legacy radio 102 by a first cable 130 and connectable to the user device 106 by a second cable 132. Referring to FIG. 2B, the appliqué 100 may include a bump-in-the-connector appliqué 100b. For example, the bump-in-the-connector appliqué 100b may include a first interface 116a directly connectable to the user device 106 (e.g., an intercom) by a vehicular intercom port 106a of a SINGCARS Vehicular Amplifier Adapter (VAA) 136. The VAA 136 may include a vehicular mount, the vehicular mount incorporating the vehicular intercom port 106a. The bump-in-the-connector appliqué 100b may further be connectable to an intercom cable 106b of the user device 106.

Figure 3A:
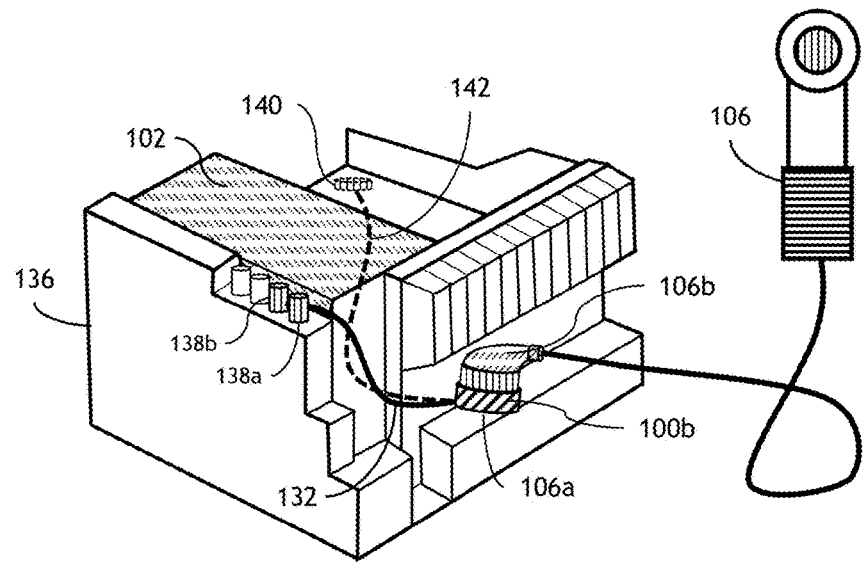
FIGS. 3A and 3B are illustrations of an appliqué and legacy radio according to embodiments of the inventive concepts disclosed herein.

Referring to FIG. 3A, the bump-in-the-connector appliqué 100b may be connected to an intercom port 106a of the vehicular mount of the VAA 136 by its first interface 116a (not shown) and additionally connected to an intercom cable 106b of the user device 106. The bump-in-the-connector appliqué 100b may be connected (at the second interface 118, not shown) to the remote control binding posts 138a, 138b of the legacy radio 102 by a second cable 132, or the bump-in-the-connector appliqué 100b may be connected to an alternate port 140 of the VAA 136 (including mount) by a third cable 142. In one embodiment, either the bump-in-the-wire appliqué 100a or the bump-in-the-connector appliqué 100b may be connected to a legacy radio 102 (not shown).

Figure 3B:
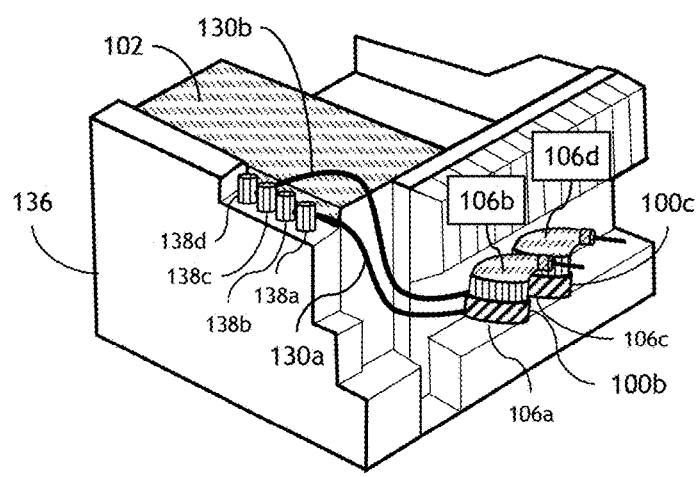

Referring to FIG. 3B, one or more bump-in-the-connector appliqués 100b, 100c may be connected to a VAA 136 housing one or more legacy radios 102 connected via vehicular mount of the VAA 136. For example, a first bump-in-the-connector appliqué 100b may be connected to intercom port 106a of the vehicular mount of the VAA 136 and intercom cable 106b of a first user device 106, and to the remote control binding posts 138a, 138b of the VAA 136 (e.g., of a first legacy radio 102) by the first cable 130a. The second bump-in-the-connector appliqué 100c may be connected to a second intercom port 106c of the vehicular mount of the VAA 136 and a second intercom cable 106d of a second user device 106, and to the remote control binding posts 138c, 138d of the VAA 136 (e.g., of a second legacy radio 102) by a second cable 130b.

Figure 4A:
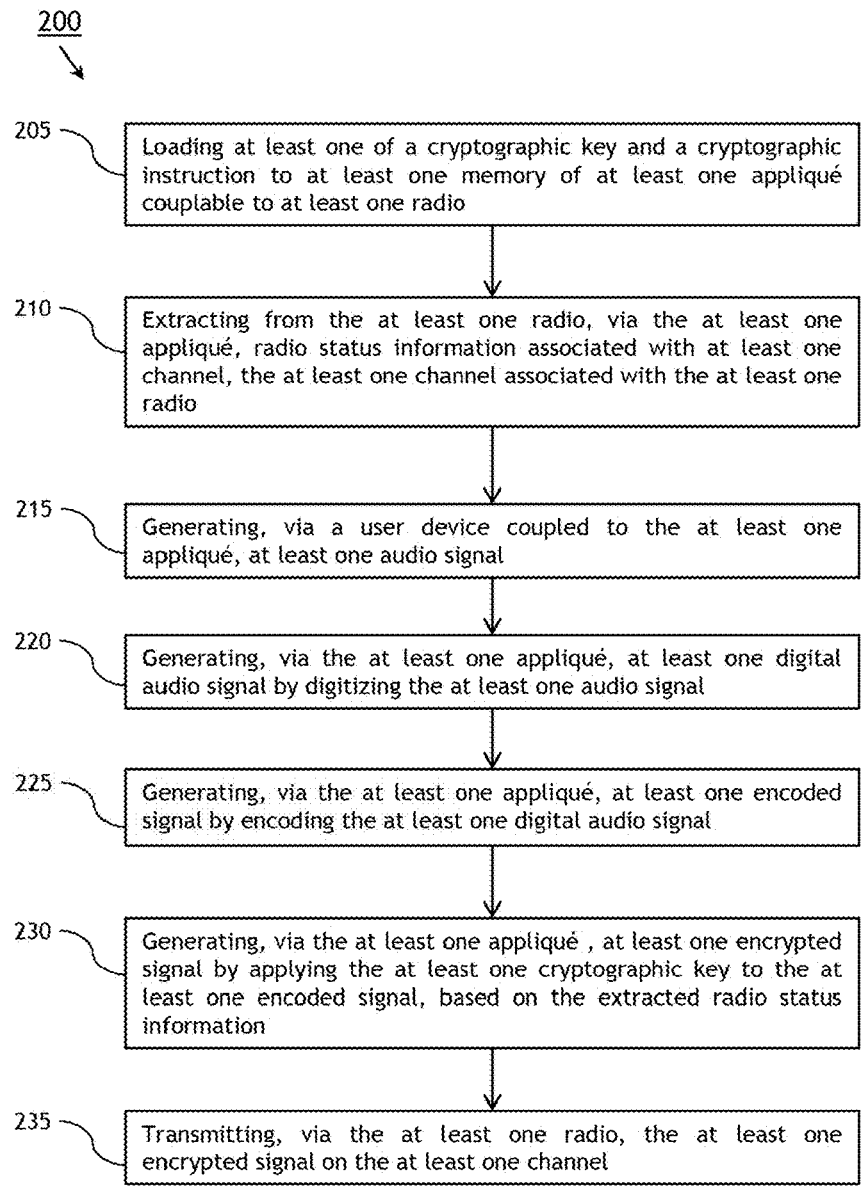
FIGS. 4A, 4B, and 4C are process flow diagrams illustrating a method according to embodiments of the inventive concepts disclosed herein.
Figure 4B:

FIGS. 4A and 4B illustrate a process flow diagram of a method 200 for external cryptographic capability to at least one legacy radio 102 according to embodiments of the inventive concepts disclosed herein. It is noted herein that the method 200 may be carried out utilizing any of the embodiments described previously. It is further noted that method 200 is not limited to the components or configurations described previously, as multiple components and/or configurations may be suitable for executing method 200.

At a step 205, an appliqué 100 couplable to the legacy radio 102 loads at least one of a cryptographic key and a cryptographic instruction to its memory 108. For example, the appliqué 100 may be a bump-in-the-wire appliqué 100a couplable to the legacy radio 102 by a cable 130 or a bump-in-the-connector appliqué 100b directly couplable to the user device 106. The cryptographic key may include a TSVCIS 2.1 or other CMI-compliant COMSEC key. The cryptographic instruction may include an alarm condition.

At a step 210, the appliqué 100 extracts from the legacy radio 102 radio status information associated with at least one channel, the at least one channel associated with the legacy radio 102. The radio status information may be extracted either from the legacy radio 102 or from the embedded cryptographic device 102a. For example, the appliqué 100 or the channel indicator 114 may listen to a plurality of channels associated with the legacy radio 102. The appliqué 100 or the channel indicator 114 may select a channel by receiving a digital signal 128 via the channel or by voice recognition of spoken content on the channel. The appliqué 100 or the channel indicator 114 may extract a channel identifier corresponding to the selected channel or cryptographic instructions associated with the selected channel. Further, the appliqué 100 or the channel indicator 114 may extract radio status information by intercepting a control signal sent to the legacy radio 102 by the user device 106. The appliqué 100 or the channel indicator 114 may extract radio status information by polling the legacy radio 102.

At a step 215, a user device 106 coupled to the appliqué 100 generates at least one audio signal 122a. If the at least one audio signal 122a does not require external encryption, the first interface 116 may pass the at least one audio signal 122a to the legacy radio 102 via the second interface 118.

At a step 220, an analog/digital converter component 124 of the appliqué 100 generates a digital audio signal 122b based on the audio signal 122a.

At a step 225, a vocoder/decoder 126 of the appliqué 100 generates an encoded signal 122c based on the digital audio signal 122b.

At a step 230, a cryptographic management interface 110 of the appliqué 100 generates an encrypted signal 122d by applying a cryptographic key to the encoded signal 122c based on the extracted radio status information stored in the memory 108 of the appliqué 100.

At a step 235, the legacy radio 102 transmits the encrypted signal 122d via the designated channel.

Referring to FIG. 4B, the method 200 may include an additional step 240. At a step 280, the cryptographic management interface 110 zeroizes the appliqué 100 by deleting from the memory 108 of the appliqué 100 the at least one cryptographic key and at least one cryptographic instruction.

Figure 4C:
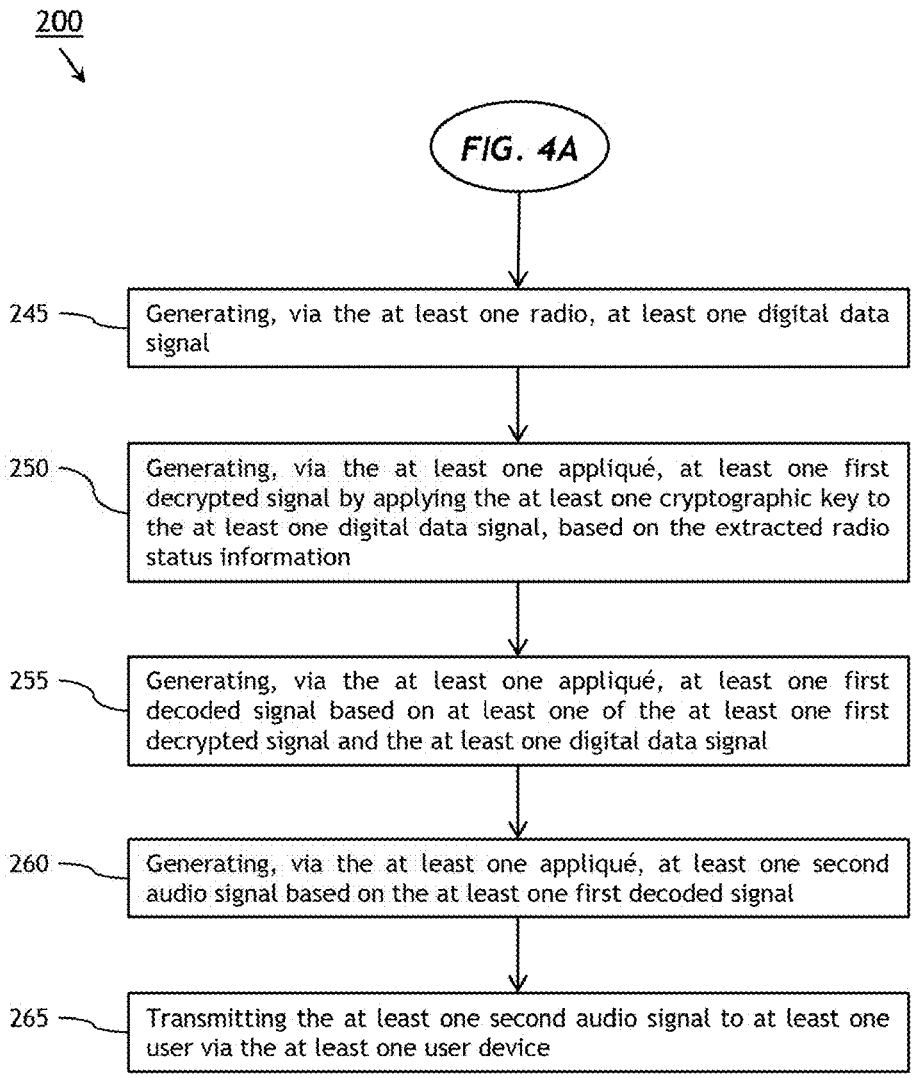

Referring to FIG. 4C, the method 200 may include additional steps 245, 250, 255, 260, and 265. At a step 245, the legacy radio 102 generates a digital data signal 128. At a step 250, the cryptographic management interface 110 generates a first decrypted signal 128b by applying a cryptographic key to the digital data signal 128 based on the extracted radio status information stored in the memory 108 of the appliqué 100.

At a step 255, the vocoder/decoder 126 generates a first decoded signal 128c based on either the first decrypted signal 128b or the digital data signal 128.

At a step 260, the analog/digital converter component 124 generates a second audio signal 128d based on the first decoded signal 128c.

At a step 265, the at least one user device 106 transmits the second audio signal 128d to the user 104.

While particular aspects of the inventive concepts disclosed herein have been shown and described, it will be apparent to those skilled in the art that, based upon the teachings herein, changes and modifications may be made without departing from the scope of the inventive concepts disclosed herein and their broader aspects and, therefore, the appended claims are to encompass within their scope all such changes and modifications as are within the broad scope of the inventive concepts disclosed herein.

We claim:

1. An apparatus for providing external cryptographic capability, comprising:
at least one first interface coupled to a first user device via at least one first cable of a bump-in-the-wire device and to at least one third interface of the first user device via a first bump-in-the-connector device, the at least one first interface configured to receive a first audio signal from the a first user device;
at least one second interface coupled to at least one radio via at least one second cable of the bump-in-the-wire device and via at least one third cable of the first bump-in-the-connector device, the at least one second interface configured to receive a first digital signal from the at least one radio, the at least one radio comprising a Vehicular Amplifier Adapter (VAA) including at least one SINCGARS radio mounted thereto via at least one vehicular mount, the at least one third interface comprising an intercom port of the VAA and a user port of the SINCGARS radio, and the at least one second interface coupled to at least one remote control binding post of the VAA; and
a second bump-in-the-connector device connected to the VAA via a second intercom post and at least one remote control binding post, and to a second user device;
at least one memory coupled to at least one processor and configured to store 1) radio status information extracted from the at least one radio, the radio status information associated with a plurality of channels used by the at least one radio, 2) one or more cryptographic keys, and 3) one or more cryptographic instructions;
the at least one processor configured to:
generate at least one first digital audio signal based on the at least one first audio signal;
generate at least one first encoded signal by encoding the at least one first digital audio signal via a mixed excitation linear prediction coding protocol;
generate at least one first transmission signal by applying the one or more cryptographic keys to the at least one first encoded signal based on the extracted radio status information;
identify a transmission channel by listening to the plurality of channels for spoken text via a voice recognition algorithm;
pass the at least one first audio signal to the at least one second interface;
generate at least one second encoded signal by applying the one or more cryptographic keys to the at least one first digital signal based on the extracted radio status information;
generate at least one second digital audio signal by decoding at least one of the second encoded signal and the first digital signal;
generate at least one second audio signal based on the at least one second digital audio signal; and
pass the at least one first digital signal to the at least one first interface; and
at least one cryptographic engine coupled to the at least one processor, the at least one cryptographic engine configured to:
load the one or more cryptographic keys based on the one or more cryptographic instructions;
perform at least one key rollover based on the one or more cryptographic instructions; and
periodically poll the at least one radio for authorization to zeroize the apparatus; and
zeroize the apparatus by deleting from the at least one memory at least one of the one or more cryptographic keys and the one or more cryptographic instructions in response to the lack of a negative reply to the authorization to zeroize the apparatus.

2. The apparatus of claim 1, wherein the a first user device includes at least one of a handset, a headset, and an intercom.

3. The apparatus of claim 1, wherein:
the one or more cryptographic instructions include at least one alarm condition;
the at least one cryptographic engine is configured to generate at least one alarm based on the at least one alarm condition; and
the at least one first interface is configured to transmit the at least one alarm to the a first user device.

4. The apparatus of claim 1, further comprising:
at least one channel indicator coupled to the at least one second interface, the at least one channel indicator configured to extract the radio status information.

5. The apparatus of claim 4, wherein the at least one channel indicator is configured to extract the radio status information by at least one of:

intercepting at least one control signal sent to the at least one radio by the a first user device; and
polling the at least one radio.

6. The apparatus of claim 4, wherein:
the at least one channel indicator is configured to extract the radio status information by listening to a plurality of channels used by the at least one radio; and
the radio status information includes at least one of a channel identifier corresponding to a channel selected from the plurality of channels and a cryptographic instruction associated with the selected channel.

7. The apparatus of claim 6, wherein the at least one channel indicator is configured to:
identify the first digital signal received on at least one first channel selected from the plurality of channels;
select the at least one first channel for transmission of the first transmission signal;
recognize spoken content on at least one second channel selected from the plurality of channels;
select the at least one second channel for at least one of reception of the first digital signal and transmission of the first transmission signal; and
extracting the radio status information associated with at least one of the first channel and the second channel.

8. The apparatus of claim 1, wherein the at least one cryptographic engine supports at least TSV 2.1 compliant COMSEC.

9. The apparatus of claim 1, further comprising:
at least one power source coupled to the second interface and configured to draw power from the at least one first digital signal.

10. A method for providing external cryptographic capability, comprising:
loading a cryptographic key and a cryptographic instruction to at least one memory of at least one appliqué coupled to at least one radio, the at least one radio comprising a Vehicular Amplifier Adapter (VAA) including at least one SINCGARS radio mounted thereto via at least one vehicular mount, an intercom port of the VAA coupled a user port of the SINCGARS radio to a first bump-in-the-wire device, and at least one remote control binding post of the VAA, and connected to a user device via a second bump-in-the-wire device on the at least one remote control binding post;
extracting from the at least one radio, via the at least one appliqué, radio status information associated with at least one channel, the at least one channel associated with the at least one radio, and the radio status information including criteria to zeroize the cryptographic key;
generating, via a user device coupled to the at least one appliqué, at least one audio signal;
generating, via the at least one appliqué, at least one digital audio signal by digitizing the at least one audio signal;
generating, via the at least one appliqué, at least one encoded signal by encoding the at least one digital audio signal via a mixed excitation linear prediction coding protocol;
generating, via the at least one appliqué, at least one encrypted signal by applying the at least one cryptographic key to the at least one encoded signal, based on the extracted radio status information;
identifying a transmission channel by listening to the at least one channel for spoken text via a voice recognition algorithm;
transmitting, via the at least one radio, the at least one encrypted signal on the at least one channel;
periodically performing key rollover based on a stored schedule;
periodically polling the at least one radio for authorization to zeroize the at least one appliqué; and
zeroizing the at least one appliqué by deleting from the memory the at least one cryptographic key and the at least one cryptographic instruction in response to the lack of a negative reply to the authorization to zeroize the at least one appliqué.

11. The method of claim 10, wherein loading at least one of a cryptographic key and a cryptographic instruction to at least one memory of at least one appliqué coupled to the at least one radio includes at least one of:
loading at least one of a cryptographic key and a cryptographic instruction to at least one memory of a first appliqué coupled to the at least one radio by at least one cable; and
loading at least one of a cryptographic key and a cryptographic instruction to at least one memory of a second appliqué directly coupled to the at least one user device.

12. The method of claim 10, wherein loading at least one of a cryptographic key and a cryptographic instruction to at least one memory of at least one appliqué coupled to the at least one radio includes:
loading at least one of a TSV 2.1 compliant COMSEC key and a cryptographic instruction to a memory of at least one appliqué coupled to the at least one radio.

13. The method of claim 10, wherein loading at least one of a cryptographic key and a cryptographic instruction to at least one memory of at least one appliqué coupled to the at least one radio includes:
loading at least one of a cryptographic key and an alarm condition to at least one memory of at least one appliqué coupled to at least one radio.

14. The method of claim 10, wherein extracting from the at least one radio, via the at least one appliqué, radio status information associated with at least one channel, the at least one channel associated with the at least one radio includes:
listening, via the at least one appliqué, to a plurality of channels associated with the at least one radio;
selecting the at least one channel from the plurality of channels by at least one of 1) receiving a first digital signal on the at least one channel and 2) recognizing spoken content on the at least one channel; and
extracting at least one of a channel identifier corresponding to the at least one channel and a cryptographic instruction associated with the at least one channel.

15. The method of claim 10, wherein extracting from the at least one radio, via the at least one appliqué, radio status information associated with at least one channel, the at least one channel associated with the at least one radio includes:
extracting from the at least one radio, via the at least one appliqué, radio status information associated with at least one channel, the at least one channel associated with the at least one radio by at least one of
(a) intercepting at least one control signal sent to the at least one radio by the at least one user device; and
(b) polling the at least one radio.

16. The method of claim 10, further comprising:
generating, via the at least one radio, at least one digital data signal;
generating, via the at least one appliqué, at least one first decrypted signal by applying the at least one cryptographic key to the at least one digital data signal, based on the extracted radio status information;

generating, via the at least one appliqué, at least one first decoded signal based on at least one of the at least one first decrypted signal and the at least one digital data signal;

generating, via the at least one appliqué, at least one second audio signal based on the at least one first decoded signal; and transmitting the at least one second audio signal to at least one user via the at least one user device.

* * * * *